Figure 1:
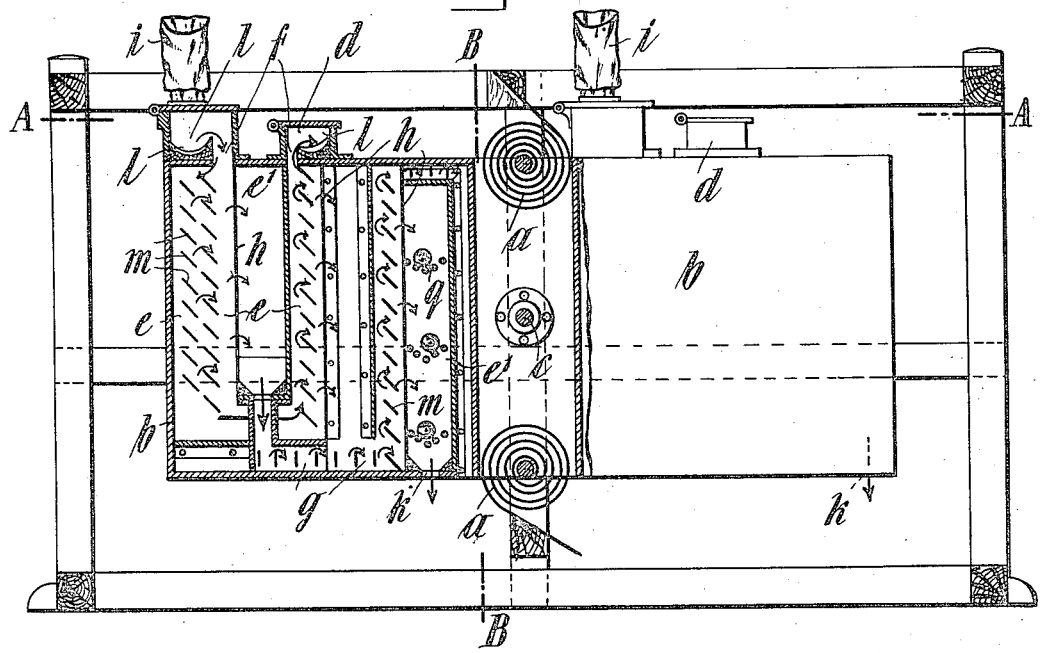

No. 841,585. PATENTED JAN. 15, 1907.
H. SECK.
MACHINE FOR BOLTING FLOUR AND GRADING GRAIN.
APPLICATION FILED OCT. 11, 1906.

5 SHEETS—SHEET 1.

Witnesses:
M. M. Hovey.
M. L. Hamm.

Inventor:
Heinrich Seck
by
Alfred Müller
Attorney.

No. 841,585. PATENTED JAN. 15, 1907.
H. SECK.
MACHINE FOR BOLTING FLOUR AND GRADING GRAIN.
APPLICATION FILED OCT. 11, 1906.
5 SHEETS—SHEET 2.
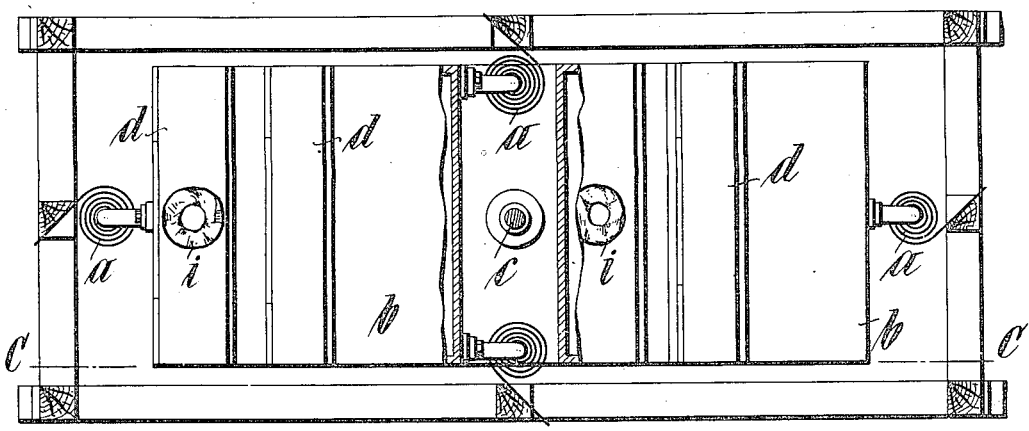
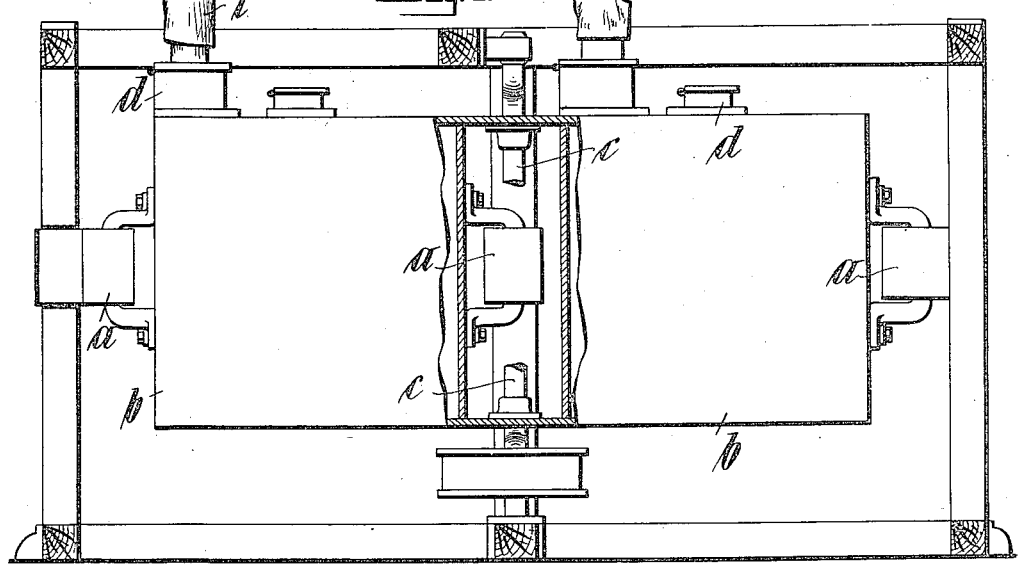
Witnesses:
M. M. Hovey
M. L. Hamm
Inventor:
Heinrich Seck
by
Alfred Miller
Attorney.

No. 841,585. PATENTED JAN. 15, 1907.
H. SECK.
MACHINE FOR BOLTING FLOUR AND GRADING GRAIN.
APPLICATION FILED OCT. 11, 1906.
5 SHEETS—SHEET 3.
Fig. 5.       Fig. 6.       Fig. 7.
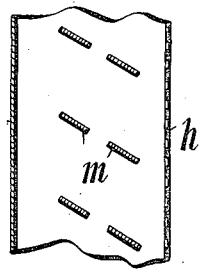 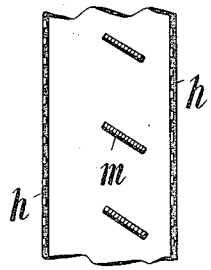 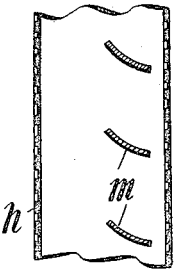
Fig. 8.       Fig. 9.       Fig. 10.
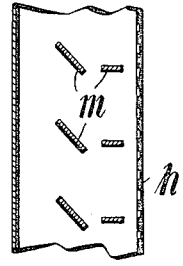 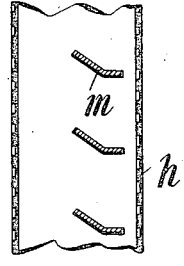 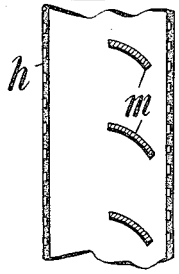
Fig. 11.      Fig. 12.      Fig. 13.
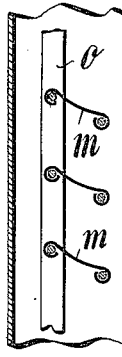 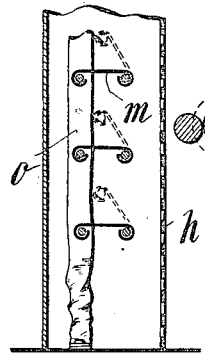 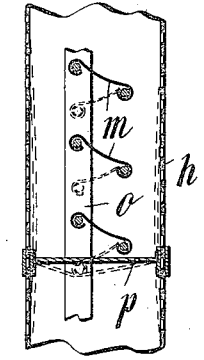
Witnesses:
M. M. Hovey
M. L. Hamm
Inventor:
Heinrich Seck
by
Alfred Müller
Attorney.

No. 841,585. PATENTED JAN. 15, 1907.
H. SECK.
MACHINE FOR BOLTING FLOUR AND GRADING GRAIN.
APPLICATION FILED OCT. 11, 1906.
5 SHEETS—SHEET 4.
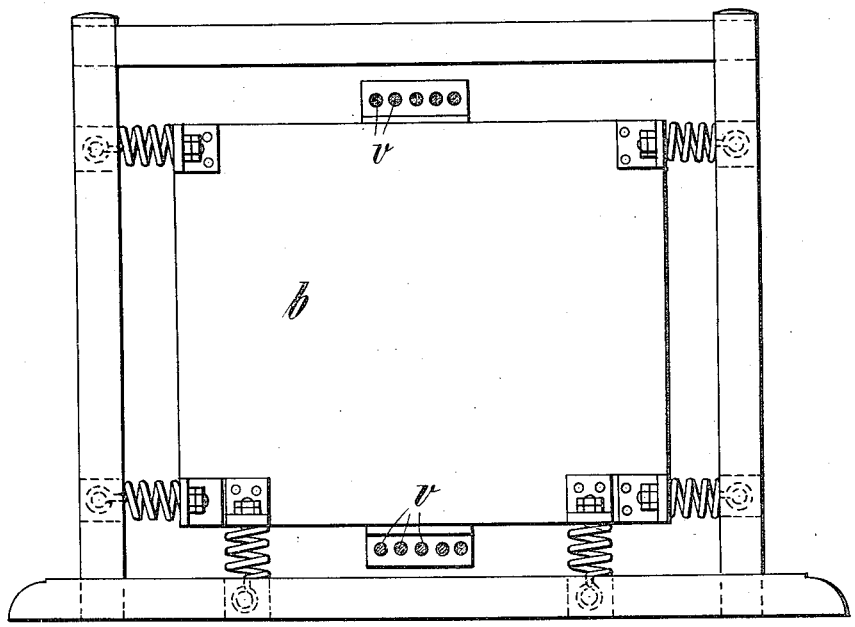
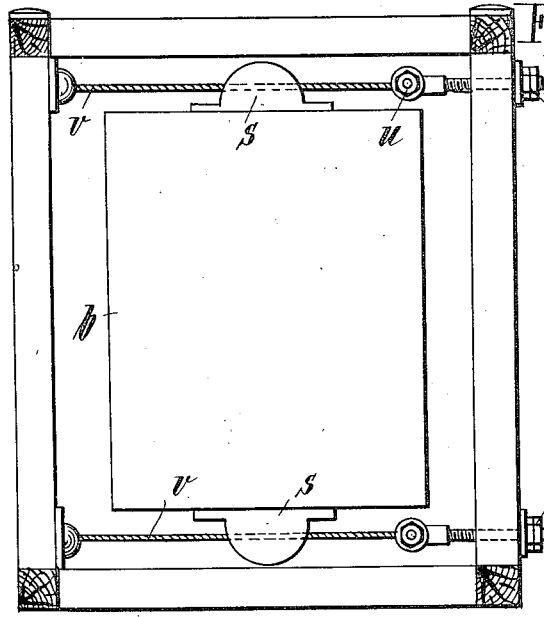
Witnesses:
M. M. Hovey
M. L. Hamm
Inventor:
Heinrich Seck
by
Alfred Muller
Attorney.

No. 841,585. PATENTED JAN. 15, 1907.
H. SECK.
MACHINE FOR BOLTING FLOUR AND GRADING GRAIN.
APPLICATION FILED OCT. 11, 1906.
5 SHEETS—SHEET 5.
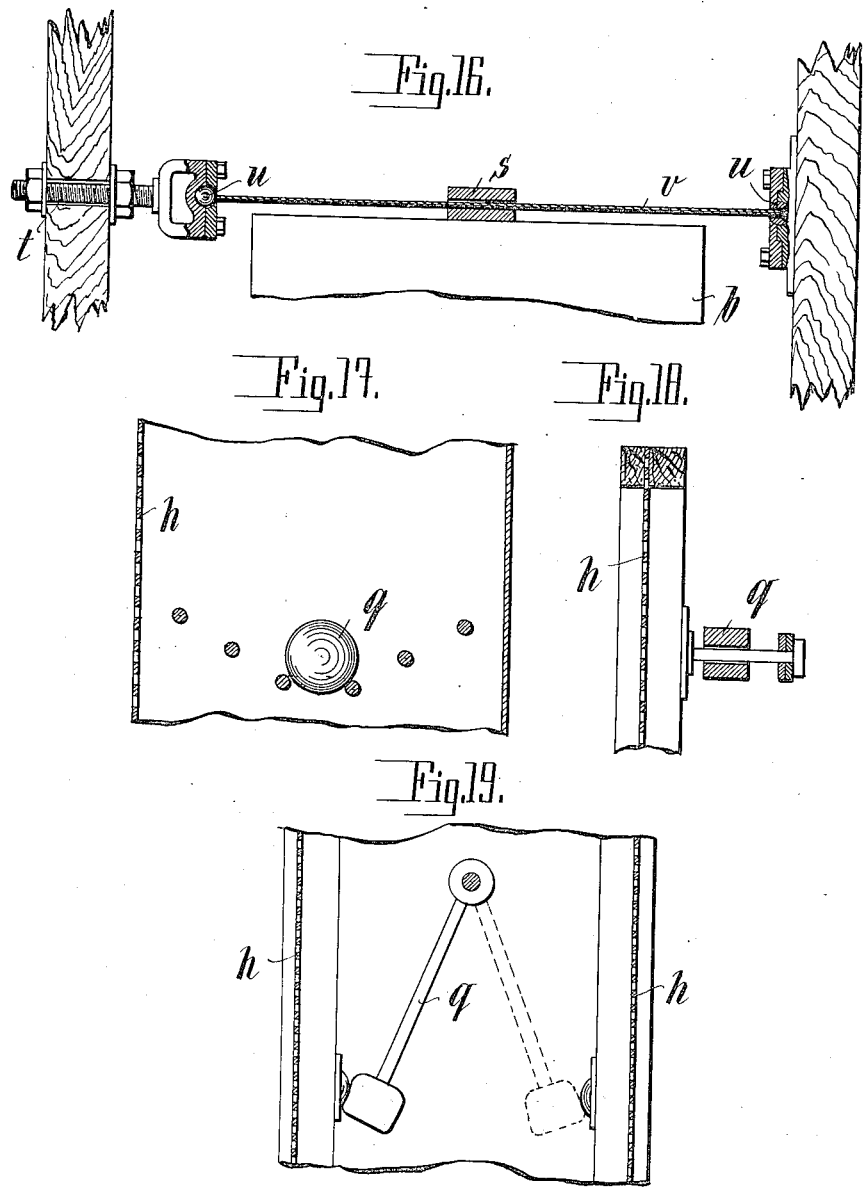

UNITED STATES PATENT OFFICE.

HEINRICH SECK, OF DRESDEN, GERMANY.

MACHINE FOR BOLTING FLOUR AND GRADING GRAIN.

No. 841,585. Specification of Letters Patent. Patented Jan. 15, 1907.

Application filed October 11, 1906. Serial No. 338,425.

*To all whom it may concern:*

Be it known that I, HEINRICH SECK, a subject of the King of Saxony, residing at Dresden, in the Kingdom of Saxony and German Empire, have invented new and useful Improvements in Machines for Bolting Flour and Grading Grain, of which the following is a specification.

The present invention has for its object a machine for bolting flour and grading grain, in which the material to be bolted is projected by deflectors placed in supply and bolting passages arranged angularly to each other, and during its entire passage through the bolting-passages the material is thrown upward and downward with great force against the sieve-walls or sieves, and thereby bolted and graded even during the admission. The material to be bolted may be conveyed both in vertical and horizontal planes and upward in the longitudinal direction and laterally. The tossing effect or force with which the deflectors project the material against the sieves may be still further considerably increased by giving the supply-deflectors a yielding and readily displaceable mounting. By this means the material is also prevented from remaining on the deflectors and adhering thereto in larger or smaller quantities. In addition to this obstruction or blocking of the sieves by the material projected with great force against them is prevented, owing to the fact that the sieves are given a constant shaking movement, which detaches the material and causes it to fall.

A constructional form of this machine is represented in the accompanying drawings, in which—

Figure 2:
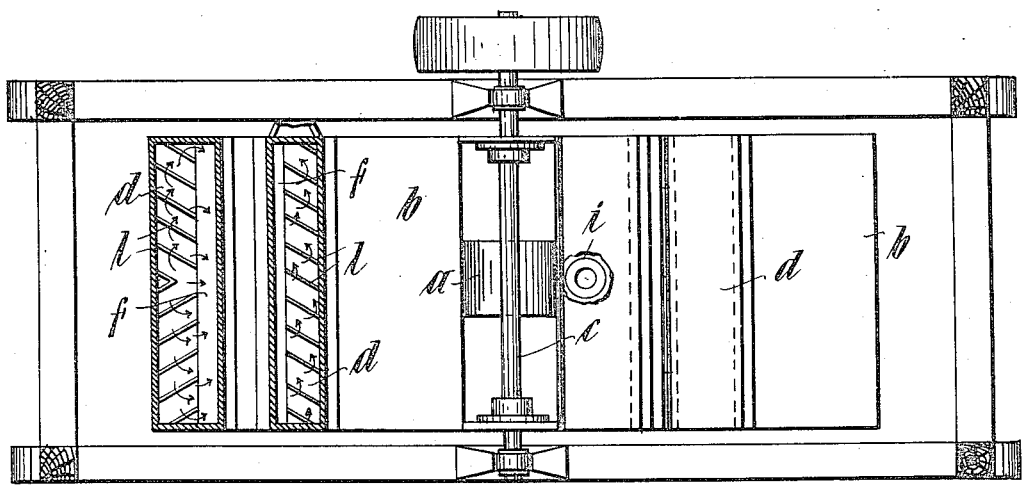

Figure 1 is a partial vertical section through the machine. Fig. 2 represents a part of the machine in horizontal section on the line A A of Fig. 1. Fig. 3 shows a constructional form of the bolting-machine with bolting-reservoir mounted or suspended to move in a horizontal plane, partly in plan and partly in section. Fig. 4 represents a section on the line C C of Fig. 3. Figs. 5 to 13 represent details of the arrangement, formation, and method of securing the deflectors arranged in the bolting-passages. Fig. 14 illustrates a constructional form in which the sifting-reservoir is suspended from cables. Fig. 15 represents a constructional form in which the bolting-reservoir is suspended from cables in conjunction with springs. Fig. 16 illustrates in section the suspension of the bolting-reservoir on cables. Figs. 17 to 19 illustrate knockers provided in or on the bolting-passages in the form of a sphere, a sliding member, and a hammer.

The machine consists of a reservoir $b$, suspended from or on spiral springs $a$, this reservoir being given a rocking movement by means of a crank-shaft $c$, eccentric, or the like and being provided with a number, corresponding to its size, of separate but simultaneously-acting bolting devices. In the machine of this constructional form it is assumed that various bolting devices are comprised. The bolting devices are formed of separate chambers or supply-passages $d$ and bolting-passages $e$, connected one with the other by passages $f g$, the supply and bolting passages being arranged at an angle to each other, the passages $d$ being horizontal and the passage $e$ being vertical. The bolting-passages $e$ are provided in the known manner with sieves or sieve-walls $h$. The passages $d$ and $e$, which are provided with inlets $i$ and outlets $k$ in accordance with requirements, are furnished with deflectors $l$ and $m$, mounted at an angle to the walls of the passages. The material to be bolted—such as reduced corn, bruised grain, groats, or the like—is introduced into the passages $d$ through the inlets $i$ and then into the passages $e$ and the bolted or sorted material—flour, groats, and the like—is withdrawn through the outlets. The deflectors $l$ and $m$ may be given any appropriate form and arranged at any suitable angle of inclination in the passages $d$ and $e$. Again, the deflectors may be arranged in a number of successive rows, Figs. 1, 6, and 8, and pivotally or swingingly mounted, Figs. 11, 12, and 13.

As shown in Figs. 1 and 2 of the accompanying drawings, the deflectors $l$, arranged in the supply-passages $d$, are segmental and arranged at an angle to the walls or to the longitudinal axis of the passages at certain intervals from each other. Owing to the segmental form of the deflectors $l$ and their arrangement at an angle in the passages $d$ it is possible to effect a uniform distribution of the material introduced throughout the entire length of the supply-passages and a bolting of the material even during its introduction, and owing to the various alternating movements of the reservoir, and consequently of the chambers or passages $d$ and $e$, the material is thrown in the direction indicated by the arrows in Figs. 1 and 2 in vertical and horizontal planes by one deflector in front of the next, being thereby uniformly distributed throughout the entire length of the feed-passages and then ejected through the openings or passages f into the bolting-passages. In these latter the material falls upon the deflectors m, which are arranged in one or more successive rows in such a manner that the edges of the deflectors m in the direction in which the material is thrown remain at a certain distance from the walls or sieves of the bolting-passages e. For the conveyance of the material in the downward direction the supply-deflectors should preferably be separated from the bolting-surfaces by a larger interval, so that the material may fall down freely. If the deflectors are turned nearer to the bolting-surfaces, they effect the feed upward. By this means the important advantage is attained that it is possible for the material to move entirely freely between the deflectors or around the same, so that the force of projection of the material is not impaired, and consequently it is repeatedly projected with great force against the sieve-walls and bolted in an exceedingly intense manner. The material entering the bolting-passages e, and therefore coming upon the deflectors m, owing to the oscillating movement of the reservoir b, is constantly projected in an intermittent or step-by-step manner, say in the direction indicated by the arrows in Fig. 1, so that it is repeatedly thrown against the sieve-walls or sieves h. In this manner the material is conveyed through all the chambers or passages of the reservoir b, gradually descending and ascending, and in this manner is bolted. The bolted material may be removed or conveyed from the several discharge-passages.

In order to increase the projecting power of the deflectors m in the case of soft or light bolting material, as shown in Figs. 11 to 13, they may be hinged or pivoted in the bolting-passages. The rotatable mounting of the deflectors m may be carried out by hinging one end of the deflectors in the bolting-passages and jointing their other end to a resiliently or yieldingly mounted belt, rod, or the like o. Owing to the rocking movement of the container b, and consequently of the chambers or bolting-passages, the deflectors are likewise caused to rock, so that the material which has reached them is projected against the sieve-walls. The belts, bars, or the like o, with which one end of the deflectors is connected, merely serve to render the movement of the deflectors m as uniform as possible and to limit their return into their initial position. The same effect could, however, be obtained by arranging stops in the chambers or passages for limiting the rocking of the deflectors.

In the constructional form illustrated in Fig. 13 the sieve-like walls of the passages are resiliently or yieldingly mounted. In this case the walls of the separate passages are connected one with the other by ropes, cords, or the like p. Now when the movable deflectors m return from their outwardly-swung position into their initial position one of them (the lowermost, for example) or a number of them simultaneously strike against the cables or the like p, connecting the walls of the sieves, by which means the sieve-walls are shaken and temporarily assume the position indicated in broken lines. Owing to this shaking of the sieve-walls, material adhering thereto or stopping the meshes of the sieve is detached and thrown off, so that the bolting-surfaces always remain free and clean. The sieve-walls or walls of the passages may, however, as shown in Figs. 1, 17, 18, and 19, be acted upon or caused to shake by means of parts mounted so as to be freely displaceable or guided or rocking in any appropriate manner—for example, by means of elastic balls, sliding members, hammers, or the like q—which serve to loosen and throw off any material adhering to the walls and remaining in the meshes of the sieves. The balls, which are preferably composed of elastic material, are mounted for this purpose on bars arranged in the manner of a grating, and during the movement of the container b run against the walls and sieves of the passages e and impart to them a short shaking movement. As shown in Figs. 18 and 19, however, displaceably-mounted sliding members or oscillating suspended hammers might be used in place of the balls.

In order to guide the containers b well and uniformly during the rocking movement, as already stated, they may be suspended in such a manner as to be readily displaceable on spiral springs or on elastic cables, cords, rods, or the like v, in combination with such springs. As shown in Figs. 14, 15, and 16, one or more cables, ropes, or elastic bars v are provided, on which the container b is displaceably suspended by means of bearings s. In order that the cables or the like v may be adjusted or tensioned as desired, they are fixed in ball-bearings u, capable of adjustment by means of screws t. Now if the container is rocked by means of the crank-shaft c, an eccentric, or the like the said container, which is carried in the manner already described on the cables, ropes, elastic bars, or the like v, is able to adapt itself very readily to each movement. It will of course be understood that the elastic displaceability of the container or containers b might be considerably increased by simultaneously providing springs. The cables or the like serving for the suspension of the container or containers may be endless or undulatory.

The operation of the machine is briefly as follows: The material to be bolted or grain which is introduced into the supply-passages *d* by the admission-apertures *i*, owing to the rocking movement of these passages, and consequently of the segmental deflectors *l* also, is uniformly distributed throughout the entire length of the passages *d* and *e* in the direction indicated by the arrow in horizontal and vertical planes and thrown into the passages *e*. Owing to the circular movement the material is thrown from wall to wall or from one bolting-surface to the other and is likewise displaced in the upward direction by the deflectors, but is prevented from falling down too speedily in the passage *e*. In the bolting-passages *e* the material is gradually moved forward by the deflectors *m* step by step in the direction indicated by the arrows, caused to circulate around the deflectors, being thrown and rubbing against the sieves or sieve-walls *h*, and thereby bolted. The bolting takes place owing to the fact that the material to be bolted which is thrown against the sieve or sieve-walls *h* is divided into a number of parts, the finest of which fall through the sieves or sieve-walls into an adjacent chamber *e'*, while the coarser parts of the material are carried intermittently or step by step through the bolting passage or passages *e*, thrown repeatedly against the sieves or sieve-walls, and again bolted in the manner already described. Descending and ascending in this manner and moving in a longitudinal and lateral direction the material traverses the several bolting-passages *d*, *e*, and *g*, and may be removed at the places or discharge passages or outlets provided for this purpose in the different grades corresponding to the several passages.

What I claim as my invention, and desire to secure by Letters Patent, is—

1. A machine for bolting flour and grading grain, comprising a yieldingly-suspended chamber having laterally-arranged, trough-shaped feed-passages and vertical perforated walls forming a series of connected bolting-passages, deflectors stationarily secured in the bottom of said feed-passages and angularly arranged to distribute the material therealong when said passages are transversely oscillated; deflectors in said bolting-passages arranged to throw the material against the walls, the deflectors in some of said passages being arranged to permit an intermittent downward feed of the material, and those in others of said passages being arranged to effect an intermittent upward feed therein, and means for oscillating said chamber.

2. A machine of the character described, comprising a movable chamber; a plurality of sieve-walls therein forming connected, vertical bolting-passages; deflectors in said passages; the deflectors in some of said passages being constructed and arranged to permit the slow downward feed of the material treated and the deflectors in others of said passages being constructed and arranged to effect the upward feed of said material, and means for shaking said movable chamber 3. In a machine of the character described, a movable chamber; vertical, yielding, connected sieve-walls in said chamber forming bolting-passages; and pivotally-mounted, connected deflectors in said passages, some of said deflectors being mounted to contact with said sieve-wall connectors; whereby said walls are shaken to free them from the material treated.

In testimony whereof I have signed my name to this specification in the presence of two subscribing witnesses.

HEINRICH SECK.

Witnesses:
FRIEDRICH WEGNER,
CARL GARZ.